United States Patent
Wheeldon et al.

(10) Patent No.: US 7,115,148 B2
(45) Date of Patent: Oct. 3, 2006

(54) COMPACT METHANOL STEAM REFORMER WITH INTEGRATED HYDROGEN SEPARATION

(75) Inventors: Ian R. Wheeldon, Kingston (CA); Brant A. Peppley, Kingston (CA); Helmut Wieland, Kingston (CA)

(73) Assignee: Her Majesty the Queen in right of Canada, as respresented by the Minister of Defence of Her Majesty's Canadian Government, Ottawa (CA)

(*) Notice: Subject to any disclaimer, the term of this patent is extended or adjusted under 35 U.S.C. 154(b) by 319 days.

(21) Appl. No.: 10/436,127

(22) Filed: May 13, 2003

(65) Prior Publication Data

US 2003/0215374 A1 Nov. 20, 2003

Related U.S. Application Data

(60) Provisional application No. 60/379,756, filed on May 14, 2002.

(51) Int. Cl.
*B01J 7/00* (2006.01)
*B01J 8/00* (2006.01)
*B01J 35/02* (2006.01)
*B01J 19/00* (2006.01)
*H01M 8/06* (2006.01)

(52) U.S. Cl. .......................... 48/61; 422/198; 422/211; 422/228; 422/217; 422/218; 48/127.9; 48/76; 48/127.7; 48/128

(58) Field of Classification Search .................. 422/49, 422/211, 188, 192, 187; 423/652
See application file for complete search history.

(56) References Cited

U.S. PATENT DOCUMENTS

| 3,144,312 A | 8/1964 | Mertens |
| 3,350,176 A | 10/1967 | Green et al. |
| 4,692,306 A * | 9/1987 | Minet et al. .................. 422/49 |

(Continued)

FOREIGN PATENT DOCUMENTS

| CA | 1288596 | 11/1987 |
| CA | 2118956 | 3/1994 |
| CA | 2274904 | 10/1998 |
| CA | 2307971 | 5/2000 |
| CA | 2310928 | 6/2000 |

(Continued)

*Primary Examiner*—Alexa Neckel
*Assistant Examiner*—Kaity Handal
(74) *Attorney, Agent, or Firm*—Stites & Harbison PLLC; Ross F. Hunt, Jr.

(57) ABSTRACT

Hydrogen is produced in a compact methanol-steam reformer, which integrates an inner cylindrical heating chamber; and a reactant vaporizer and heating zone, and an outer Cu/ZnO/Al$_2$O$_3$ catalyst bed in concentric annuli around the heating chamber. Tubular, palladium-silver alloy membranes in the catalyst bed separate hydrogen from retentate gas, which is separately discharged from the apparatus through a manifold.

12 Claims, 3 Drawing Sheets

U.S. PATENT DOCUMENTS

| | | |
|---|---|---|
| 4,861,347 A | 8/1989 | Szydlowski et al. |
| 5,226,928 A | 7/1993 | Makabe et al. |
| 5,639,431 A | 6/1997 | Shirasaki et al. |
| 5,858,314 A * | 1/1999 | Hsu et al. .................... 422/211 |
| 5,861,137 A * | 1/1999 | Edlund ....................... 423/652 |
| 5,932,181 A * | 8/1999 | Kim et al. ................... 422/188 |
| 5,997,594 A | 12/1999 | Edlund et al. |
| 6,162,267 A | 12/2000 | Priegnitz et al. |
| 6,190,623 B1 * | 2/2001 | Sanger et al. ............... 422/192 |
| 6,221,117 B1 | 4/2001 | Edlund et al. |
| 6,413,479 B1 | 7/2002 | Kudo et al. |
| 2002/0011152 A1 | 1/2002 | Oku et al. |
| 2002/0172630 A1 | 11/2002 | Ahmed et al. |

FOREIGN PATENT DOCUMENTS

| | | |
|---|---|---|
| CA | 2323660 | 10/2000 |
| CA | 2345966 | 3/2001 |
| CA | 2351867 | 6/2001 |
| CA | 2357960 | 9/2001 |

* cited by examiner

COMPACT METHANOL STEAM REFORMER WITH INTEGRATED HYDROGEN SEPARATION

CROSS-REFERENCE TO RELATED APPLICATIONS

This application claims benefit of U.S. Provisional Application No. 60/379,756, filed May 14, 2002.

BACKGROUND OF THE INVENTION

1. Field of the Invention

This invention relates to an apparatus for producing hydrogen, and in particular to a compact methanol-steam reformer.

The initial commercial sales of fuel cells will most likely be to a niche market of small off-grid power applications. These applications are characterised by a need for reliable, efficient and compact yet portable systems. The cell technology receiving the most industrial attention is the polymer electrolyte fuel cell (PEFC); the susceptibility of the PEFC anode to CO poisoning necessitates a nearly pure hydrogen source as fuel. Significant loss in PEFC efficiency can be observed with anode CO concentrations as low as 20 ppm.

An alternative to compressed hydrogen gas storage is a liquid fuel processing system. A recent study (Pattersson, L. F. et al, International Journal of Hydrogen Energy, Vol. 26, 2001) indicates that gasoline and methanol are prime candidates for near-term fuels in reforming processes. The advantages of methanol through its relatively simple kinetics, low reforming temperature and high hydrogen yield outweigh its disadvantage in a lack of distribution infrastructure particularly for non-permanent and portable applications.

2. Discussion of the Prior Art

Indeed, there has been a great deal of activity in the area of methanol-steam reforming apparatuses. In this connection, reference is made to Canadian Patents Nos. 1,288,596, issued to D. F. Szydlowski et al on Sep. 10, 1991 and 2,118,956, issued to Y. Shirasaki et al on Aug. 25, 1998, laid open Canadian Applications Nos. 2,274,904, filed by D. J. Edlund et al on Oct. 14, 1998; 2,307,971, filed by M. Iijima, et al on May 9, 2000; 2,310,928, filed by K. Kobayashi et al on Jun. 5, 2000; 2,323,660, filed by K. M. Vanden Bussche et al on Oct. 18, 2000; 2,345,966, filed by D. J. Edlund et al on Apr. 14, 1999; 2,351,867, filed by T. Seki et al on Jun. 26, 2001 and 2,357,960, filed by T. Miura et al on Sep. 28, 2001, U.S. Pat. No. 3,144,312, issued to C. Mertens on Aug. 11, 1964; U.S. Pat. No. 3,350,176, issued to R. B. Green et al on Oct. 31, 1967; U.S. Pat. No. 4,692,306, issued to R. G. Minet et al on Sep. 8, 1987; U.S. Pat. No. 4,861,347, issued to D. F. Szydlowski et al on Aug. 29, 1989; U.S. Pat. No. 5,226,928, issued to T. Makabe et al on Jul. 13, 1993; U.S. Pat. No. 5,639,431, issued to Y. Shirasaki et al on Jun. 17, 1997; U.S. Pat. No. 5,932,181, issued to T. C. Kim et al on Aug. 3, 1999; U.S. Pat. No. 5,997,594, issued to D. J. Edlund et al on Dec. 7, 1999; U.S. Pat. No. 6,162,267, issued to J. W. Priegnitz et al on Dec. 19, 2000; U.S. Pat. No. 6,221,117, issued to D. J. Edlund et al on Apr. 24, 2001 and U.S. Pat. No. 6,413,479, issued to H. Kudo et al on Jul. 2, 2002, and laid open US Applications Nos. 2002/0011152, filed in the name of M. Oku et al on Jun. 25, 2001 and 2002/0172630, filed in the name of S. Ahmed et al on Mar. 21, 2001.

In general, existing apparatuses have separate reforming and purification sub-systems which results in an overall apparatuses of significant size. While systems combining the reforming and purification processes have been proposed, it is common to encounter heat transfer problems because of the highly endothermic nature of the reaction network which necessitates a large heat transfer area. Thus, a need still exists for a system which minimizes size while maximizing heat transfer areas.

GENERAL DESCRIPTION OF THE INVENTION

An object of the present invention is to satisfy the above-defined need by providing a relatively simple methanol-steam reforming apparatus, which effectively combines vaporizing, reaction and purification sections in a compact unit.

Accordingly, the invention relates to a methanol-steam reforming apparatus for producing hydrogen comprising:

(a) a housing having first and second end walls;
(b) a first vessel extending into said housing from the first end wall defining a heating chamber;
(c) at least one heater in said heating chamber;
(d) a second vessel in said housing surrounding and spaced apart from the first vessel and having a closed end and a free end spaced apart from said first end wall defining a gap through which fluid can flow, the area between the first and second vessels defining a heating zone, and the area between the second vessel and the housing defining a reaction chamber extending around a major portion of the second vessel;
(e) an inlet duct extending through said first end wall and said first vessel into said heating zone for introducing reactants into said heating zone;
(f) a heat conducting mesh in said heating zone for heating reactants and conducting heat from said first vessel to said second vessel;
(g) a catalyst bed filling said reaction chamber for causing methanol and steam to react to produce hydrogen;
(h) a plurality of tubular hydrogen permeable membranes in said catalyst chamber extending through said second end wall;
(i) a hydrogen outlet passage in said second end wall for receiving hydrogen from said membranes and discharging the hydrogen from the apparatus;
(j) a retentate manifold in said reaction chamber connected to said second vessel at said closed end thereof, said manifold having a sieve for admitting retentate gases into the manifold; and
(k) a retentate outlet connected to said manifold for discharging retentate gases from said housing

BRIEF DESCRIPTION OF THE DRAWINGS

The invention is described below in greater detail with reference to the accompanying drawings, wherein.

DESCRIPTION OF THE PREFERRED EMBODIMENT

Figure 1:
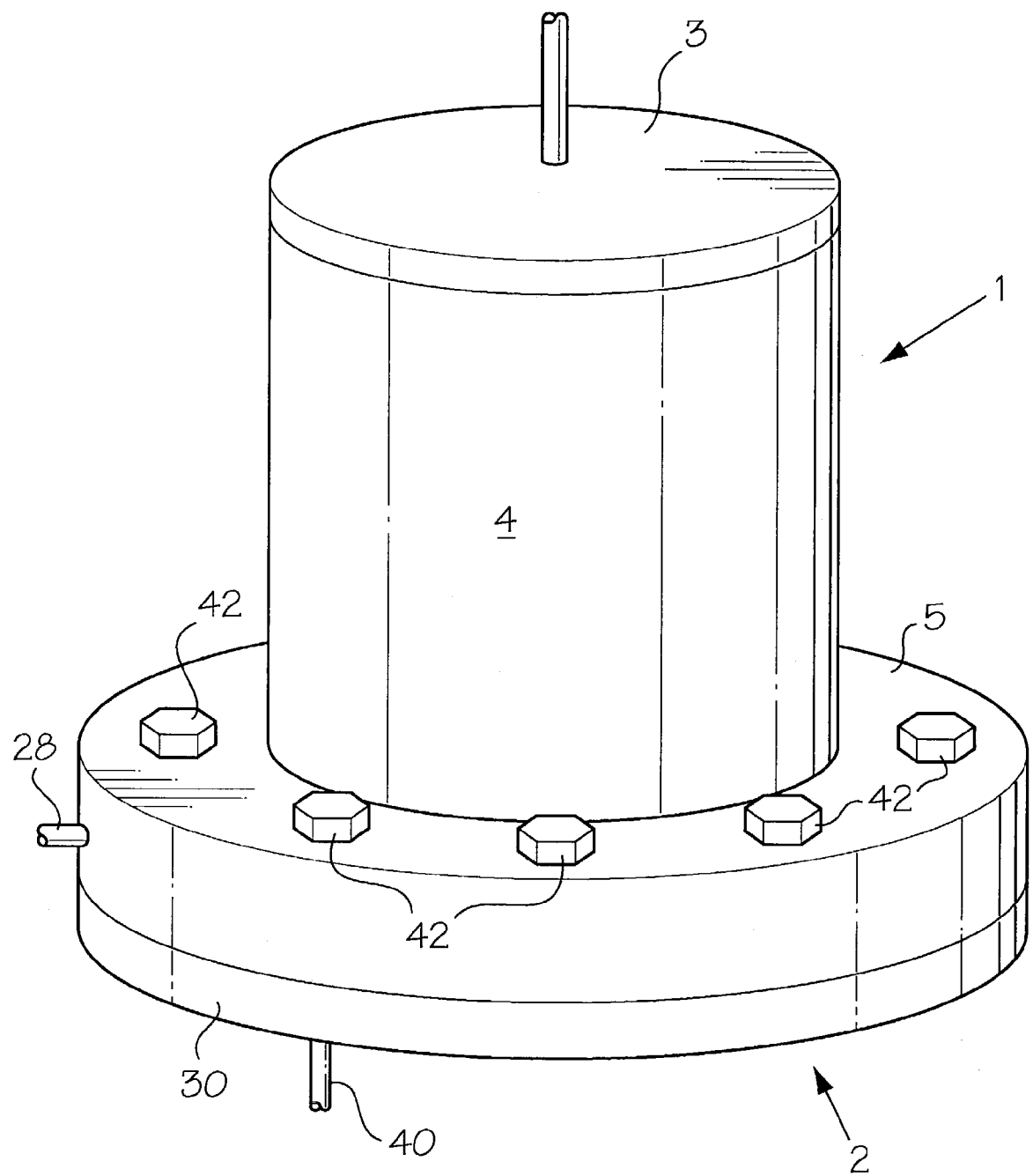
FIG. 1 is an isometric view of a methanol-steam reforming apparatus in accordance with the present invention.
Figure 2:
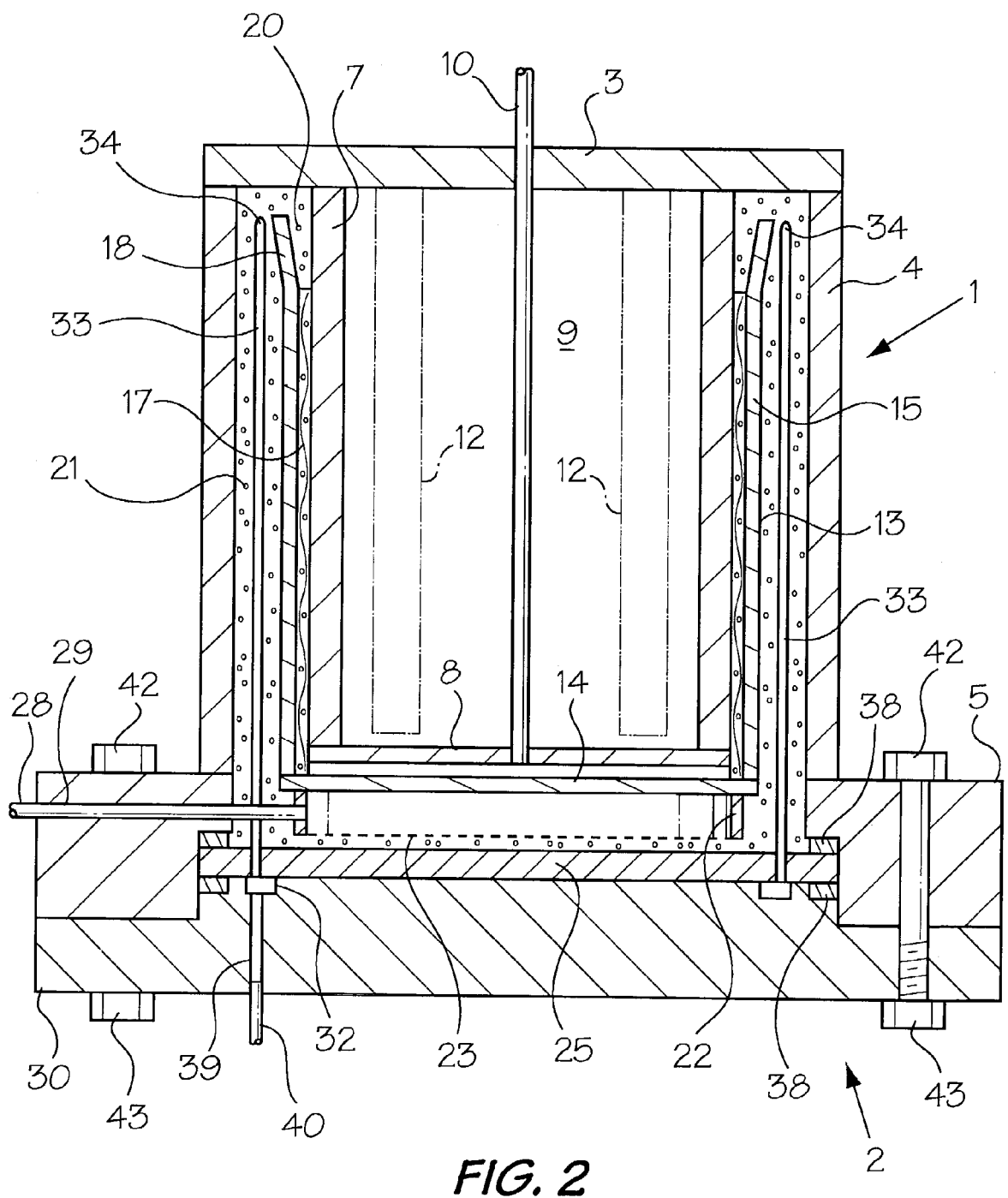
FIG. 2 is a longitudinal, sectional view of the apparatus of FIG. 1.

Referring to FIGS. 1 and 2, the reformer of the present invention includes a housing defined by a cylindrical upper portion and a larger diameter cylindrical base indicated generally at 1 and 2, respectively.

The upper portion 1 of the housing includes a circular top wall 3, a cylindrical outer wall 4 connected to an annular upper section 5 of the base 2, and a cylindrical inner wall 7. The top wall 3, the inner wall 7 and a circular bottom wall 8 at the lower end of the inner wall 7 form a first, closed vessel defining a heating chamber 9. An inlet tube 10 extends through the top wall 3 and the bottom wall 8 for introducing reactants (water and methanol) into the apparatus. Heaters 12 suspended from the top wall 3 extend into the chamber 9 for initial heating and vaporizing of the reactants-flowing into the apparatus through the tube 10.

In the laboratory version of the apparatus, a battery of electrical heaters was used in the chamber 9. However, the electrical heaters can be replaced by catalytic burners capable of burning retentate gas at a constant temperature. Such a system is described, inter alia, in the above-mentioned Edlund et al Canadian Patent Application No. 2,274,904.

Reactants leaving the tube 10 are directed radially outwardly and then upwardly through a heating zone located between a second vessel and the inner wall 7. The second vessel is defined by a cup-shaped partition 13, which includes a circular baseplate 14 and a cylindrical side wall 15. A wire mesh 17 is provided in the heating zone. The wire mesh 17 is heated by conduction, and serves to volatilize and heat the reactants to the desired reaction temperature above 200° C., and preferably 240–280° C. The mesh 17 causes the reactants to follow a circuitous route through the heating zone, ensuring that the reactants are completely vaporized and heated to the reaction temperature. The mesh 17 extends upwardly to a flared top end 18 of the side wall 15 and supports the inlet end 20 of a particulate catalyst bed 21. The catalyst bed 21 is formed of copper, zinc oxide and alumina.

The remainder of the catalyst bed 21 is housed in a reaction chamber defined by the top and outer walls 3 and 4, respectively of the housing top portion 1, the side wall 15 of the partition 13, the cylindrical side 22 of a retentate outlet manifold 23, the inner periphery of the annular upper section 5 of the base, and a circular membrane plate 25. The plate 25, which forms part of the base 2 is spaced a short distance apart from the manifold 23 to permit the flow of retentate between the manifold and the plate 25.

Figure 3:
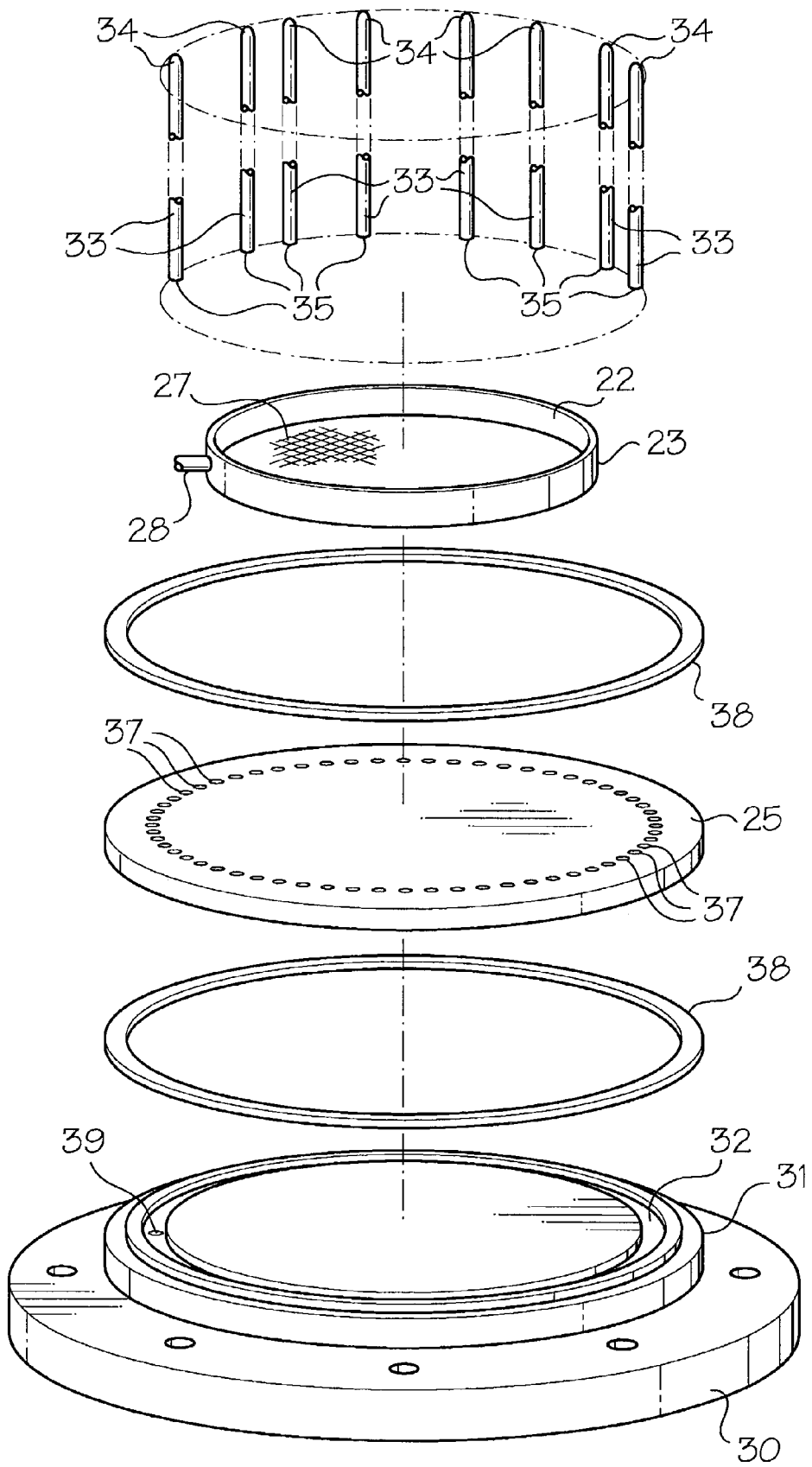
FIG. 3 is an exploded, isometric view of selected elements of the apparatus of FIGS. 1 and 2.

As best shown in FIG. 3, the manifold includes the cylindrical side 22 and a bottom defined by a fine mesh, circular screen 27. Fluid entering the manifold 23 is discharged via an outlet duct 28 which extends radially outwardly through the catalyst bed 21 and a radially extending outlet passage 29 in the upper section 5 of the base 2.

The base 2 is completed by a cylindrical lower section 30, which is best shown in FIG. 3, includes a raised central area 31 containing an annular trough 32 for receiving hydrogen gas from hydrogen permeable membranes 33. The membranes 33 are narrow diameter, palladium alloy tubes with closed top ends 34 and open bottom ends 35. The bottom ends 35 of the membranes extend through holes 37 in the plate 25 for discharging hydrogen into the trough 32. The plate 25 is sandwiched between annular copper gaskets 38 and the upper and lower sections 5 and 30 of the base. Hydrogen is discharged from the trough 32 via an outlet passage 39 in the bottom section 30 of the base and an outlet tube 40 (FIGS. 1 and 2). The upper and lower sections 5 and 30 of the base 1 are held together by bolts 42 and nuts 43.

The above described apparatus is used in a methanol-steam reforming process for producing hydrogen described below The methanol-steam reforming reaction network over copper, zinc oxide and alumina ($Cu/ZnO/Al_2O_3$) has been well documented (see B. A. Peppley et al, "Methanol-Steam Reforming On $Cu/ZnO/Al_2O_3$, Part 1: The Reaction Network" in Applied Catalyst A General, Vol. 178, 1999, pages 21–29) and involves the following three reactions: the steam reforming of methanol, the water-gas-shift reaction and the decomposition of methanol.

$$CH_3OH + H_2O \leftrightarrows 3H_2 + CO_2 \tag{1}$$

$$CO + H_2O \leftrightarrows H_2 + CO_2 \tag{2}$$

$$CH_3OH \rightarrow 2H_2 + CO \tag{3}$$

At temperature above 200° C., with sufficient catalyst, conversions approaching 100% are achievable. Under such conditions, the proportions of $H_2/CO_2/CO$ in the product gas are typically 74/24/2 (see J. C. Amphlett et al in a paper entitled "Hydrogen Production By Steam Reforming Of Methanol For Polymer Electrolyte Fuel Cells" in the International Journal of Hydrogen Energy, Vol. 19, No. 2, 1994, pages 131–137).

In operation of the apparatus, an external pump (not shown) is used to pump the reactants ($CH_3OH$ and $H_2O$) through the inlet tube 10. During passage through the chamber 9, the reactants begin to vaporize. Upon exiting the inlet tube 10, the reactants pass through the wire mesh 17 in the heating zone into the top end 20 of the catalyst bed 21 where they are completely vaporized, and heated to the desired reaction temperature.

A thermodynamic analysis of the steam reforming process indicates that, at approximately 80% methanol conversion (reformer temperature of 280° C.), the energy available from the combustion of the retentate will equal the energy required to vaporize and bring the reactants to operating temperature and drive the endothermic steam reforming reaction. The conditions at which this occurs will be referred to as the autothermal point. If efficiency is defined as the proportion of electrical equivalent power output of hydrogen gas from the reformer from the lower heating value of inlet methanol, then efficiency is proportional to the autothermal point. The ideal autothermal point requires 100% efficiency in the generation of heat from the combustion of the retentate and in the transfer of the generated heat to the catalyst bed and vaporizer.

One important feature of the apparatus of this invention is that the first part (approximately 5%) of the catalyst bed 21 is free of $H_2$ permeable membranes 23, i.e. the hydrogen producing reaction is initiated without hydrogen separation or purification occurring. During passage through the remainder of the catalyst bed 21, the above three reactions continue to occur. Hydrogen is discharged through the membrane plate 25, the trough 32, the passage 35 and the tube 36. Retentate flows beneath the manifold 23, passes through the sieve 27 into the manifold and is discharged from the apparatus via outlet duct 28. The laboratory model of the apparatus described above utilized a simulation of methanol-steam reformer with integrated Pd-alloy membranes.

Details of this simulation have been published elsewhere [Amphlett, J. C., Keith, M. B. A., Mann, R. F., Peppley, B. A., and Thurgood, C. P., Influence Of Pressure And Heating Strategy On The Productivity Of A Pd-alloy Membrane Reactor Source, *Proceedings Of The World Hydrogen Energy Conference*, Jun. 11–13 (2000), 1311–1317, Productivity Of A Pd-alloy Membrane Reactor, WHEC 2000]. The simulation was based on a tubular membrane reactor that employs the methanol-steam reforming kinetic model outlined by Peppley et al. [Peppley, B. A., Amphleft, J. D., Kearns, L. M., and Mann, R. F., Methanol-Steam Reforming On Cu/ZnO/Al$_2$O$_3$. Part 1: The Reaction Network, *Applied Catalysis A: General*, Vol. 179 (1999) 21–29]. The boundary conditions of the model were set so that the amount of catalyst required to produce 300 We of hydrogen (where 12 SLPM of H$_2$=1 KWe) at a conversion of 80% and a hydrogen recovery of approximately 90% would be calculated. Table 1 is a summary of the operating conditions used in the simulation.

TABLE 1

Integrated Reformer Simulation Parameters

| | |
|---|---|
| Inlet Feed Rate: MeOH/H$_2$O (ml/min) | 3.1/1.5 |
| Steam to Carbon ratio | 1.1:1 |
| Reformer Temperature (° C.) | 240 |
| Reformer Pressure (bar) | 30 |
| Methanol Conversion | 80% |
| Hydrogen Recovery | 89% |
| Mass of Catalyst (grams) | 47 |

A safety factor of 2 was applied to the resulting catalyst volume to ensure sufficient reactor space to allow for the use of other less active but possibly more heat resistant catalyst. The result is a minimum catalyst bed size of 80 cm$^3$ (47 g×2/1.2 g/cm$^3$). The volume of the catalyst bed is, however, not simply a function of the required catalyst volume but also a function of the space occupied by the membrane tubes. The maximum achievable heat transfer area in an apparatus of the type described herein is from a concentric ring configuration that is both large in radius and in length. These criteria would result in a chamber that is thin and long, a configuration impractical for the integration of Pd-alloy membrane tubes. A particle size of 50 mesh, approximately 0.3 mm, was determined to be the minimum without introducing significant pressure drop. As such the distance between each instance of a 'channel' between solid boundaries (i.e. membrane to membrane and membrane to wall) was restricted to a minimum of ten particle diameters to promote plug flow. This leads to a minimum radial width of the reaction chamber of 0.8 cm (Tube OD=0.2 cm). The length of the catalyst bed was determined by the amount of membrane required to achieve acceptable hydrogen recovery. Details on the number and configuration of the membranes are discussed in the following. The total volume of the catalyst bed and membranes is approximately 200 cm$^3$, which is sufficient room to house both the required catalyst and membranes to produce 300 We of hydrogen gas.

The membrane reformer simulation used in determining the amount of catalyst required was also used in determining the active membrane area necessary for our application. In a study of the effect on membrane volume and area on the equivalent power output of a membrane reformer, Amphlett et al (Amphlett, J. C., Keith, M. B. A., et al supra) state that maximum power output is achievable with a membrane to reactor volume ratio of approximately 0.3. It is, however, the ratio of active membrane area to catalyst volume that is most important to maximize. In the present case a membrane to reactor volume of 0.3 results in 1.8 cm$^2$ of evenly Pd-alloy membrane per cm$^3$ of catalyst (Amphleff J. C., Keith, M. B. A., et al, supra). Limited by the physical restrictions imposed by the plug flow criteria, a ring of 60 evenly spaced apart Pd—Ag alloy tubes of outer diameter 0.2 cm and length 9.45 cm was constructed. The membrane purification unit of the required geometry was obtained from REB Research (Ferndale, Mich.). Details of similar membrane technology by REB Research and flux data have been previously published [Hooper, M., Amphlett, J. C. Mann, R. F., Peppley, B. A., and Thurgood, C. P., Experimental Studies Of Hydrogen Production By Catalytic Methanol-Steam Reforming Using a Membrane Reactor, *Proceedings Of The Hypothesis IV Conference*, Germany, 2000.] This configuration results in 1.9 cm$^2$ of active membrane area per cm$^3$ of catalyst, a value that is theoretically sufficient to meet the requirements of the present application.

The final element that requires integration into the unit is the inlet reactant vaporizer. The energy required to vaporize and bring the reactants to operating temperature represent 65% of the total energy requirement of the system; thus its configuration necessitates careful consideration. The large heat requirement of the component again creates the dilemma of a large heat transfer area in a confined space. A large surface area can be accomplished through a long, thin and wide chamber. This geometry can be incorporated into the annular reformer configuration by creating an additional annular channel around the inner combustion chamber. The vaporizer is basically a thin walled cup in which the burner sits. This configuration creates a thin and wide area. By placing the vaporizer adjacent to the combustion chamber the high heat requirement of the component can be met. This configuration also reduces the possibility of having the reactants condense in the initial portion of the catalyst bed. Condensation of reactants on the catalyst is detrimental to the activity of the catalyst [Amphlett, J. D., Kearns, L. M., Mann, R. F., Peppley, B. A., and Salvador, J. P. Impact Of Reactant Condensation On A Cu/ZnO/Al$_2$O$_3$ Catalyst Bed During Methanol-Steam Reforming For Fuel Cell Hydrogen Production, *Proceedings of 34th Intersociety Energy Conversion Engineering Conference*, Vancouver, BC, August 1999, 2573]. The total vaporizer volume is 19 cm$^3$ with a surface area of 186 cm$^2$, dimensions that are sufficiently oversized to accommodate an inlet feed of 4.6 ml/min (1.5 ml H$_2$O and 3.5 ml MeOH). The size of the vaporizer also reflects the additional volume and area required to accommodate changes in inlet flow resulting from transient loads.

The laboratory test unit used a battery of five parallel electrical heaters, with a total maximum power output of 625 W, instead of a burner unit.

The operating conditions of a membrane reformer will be different from a conventional reformer primarily in the operating pressure. A significantly higher operating pressure is required to provide the driving force for the diffusion of hydrogen across the membranes. The upper limit of the Pd—Ag membranes constructed by REB Research is 25 bar. Operation at high pressure poses both difficulties and advantages. At constant temperature, increasing reformer pressure results in an increase in the initial rate of reaction and consequently an increase in energy required in the initial portion of the catalyst bed. In a conventional reactor, the increase in reaction rate is partially offset by the decrease in equilibrium conversion experienced at high pressure (Amphlett, J. D., Crever, K. A. M. et al, supra); however, there is an overall net kinetic advantage. In contrast, the equilibrium conversion remains high in over the conventional reactor. Extensive kinetic studies have also shown that there is no significant reduction in catalyst performance at pressure up to 40 bar (Amphlett, J. D., Keith, M. B. A., et al, supra). Operation in this pressure region does, however, pose higher demands on the strength of material that can be used in the construction of the unit, including both membranes and housing material.

The significant of high pressure operation is exacerbated by the operating temperature range for methanol-steam reforming catalyst. At temperatures above 280° C. Cu/ZnO/

Al$_2$O$_3$ catalyst deactivates at a significant rate. Consequently, the advantage of higher permeation at elevated temperatures cannot be utilized. A study previously published on the deactivation of Cu/ZnO/Al$_2$O$_3$ catalyst states that the operating life is greatest at 240° C. [Amphleft, J., Mann, R., Peppley, B., and Thurgood, C., A Deactivation Model For Methanol-Steam Reformation on Cu/ZnO/Al$_2$O$_3$ Catalyst for Optimizing the Production of Fuel-Cell Hydrogen, *Studies in Surface Science and Catalysis*, Vol. 139, 205–212, (2001)]. However, permeation rates at this temperature are unacceptably low. This situation indicates the need for catalysts that are stable at higher temperatures. It should be noted, however, that despite the problems associated with catalyst deactivation operation at low temperatures, relative to say gasoline reforming, offers considerable advantages both in terms of thermal integration and material construction. Common steel alloys can be used for a methanol-steam reforming, whereas very expensive high temperature materials are required for hydrocarbon reforming.

The highly endothermic nature of the methanol steam reforming reaction process requires careful thermal integration in a membrane reformer. The crux of the problem arises from the need for a highly compact unit for portable applications. These two criteria are opposite in nature—high heat transfer in a small space. The annular configuration of successive chambers (inner combustion chamber, vaporizer, and catalyst bed) successfully addresses these issues. The result is compact unit that house the required components (vaporizer, catalyst bed and Pd-alloy membranes) with sufficient heat transfer area to drive the reaction. The integration of the Pd-allow membranes into the unit introduces kinetic and thermodynamic equilibrium advantages over its conventional counterpart. At operating conditions of 25 bar, 240° C. and methanol conversion of 80% the compact methanol reformer will produce 300 We of hydrogen without the need to burn primary fuel for heating. The membrane reformer design demonstrates a high degree of process intensification. All functions—vaporization, reforming and purification, are carried out in a single unit. The product is suitable to be fed directly to the anode of a PEFC.

As described above, in essence, the apparatus of the present invention includes an inner combustion or heating chamber, an annular reactant vaporizing/heating chamber surrounding the combustion chamber and an annular reaction chamber surrounding the vaporizing/heating chamber. Most conventional reactors are oriented with the reaction chamber on the interior of the combustion chamber; however, the configuration that best ensures efficient hydrogen production is an annular catalyst bed with an inner combustion chamber. This configuration is advantageous for two reasons:

(1) The annular geometry creates more heat transfer area from the inner combustion chamber than an external combustion chamber for a reformer of equal volume and length. A tubular reactor with the same radius as the radial gap of the annular reaction chamber would need to be four times as long as the design shown in FIG. 2 to maintain an equal heat transfer area.

(2) The flow of heat from an inner combustion chambers is unidirectional, i.e. radial from the core to the exterior of the unit. The alternative creates a situation of bi-directional heat flow, i.e. from combustion chamber inwardly to the catalyst bed and outwardly to the surroundings.

The annual geometry also facilitates the integration of membrane tubes into the catalyst bed. The surface area available on which the membrane can be mounted is greater than that for a tubular geometry. In this case, the tube with a radius equal to the radial gap of the annular chamber would provide eight times less surface area to which membranes can be attached.

We claim:

1. A methanol-steam reforming apparatus for producing hydrogen comprising:
    (a) a housing having first and second end walls;
    (b) a first vessel extending into said housing from the first end wall defining a heating chamber;
    (c) at least one heater in said heating chamber;
    (d) a second vessel in said housing surrounding and spaced apart from the first vessel and having a closed end and a free end spaced apart from said first end wall defining a gap through which fluid can flow, the area between the first and second vessels defining a heating zone, and the area between the second vessel and the housing defining a reaction chamber extending around a major portion of the second vessel;
    (e) an inlet duct extending through said first end wall and said first vessel into said heating zone for introducing reactants into said heating zone;
    (f) a heat conducting mesh in said heating zone for heating reactants and conducting heat from said first vessel to said second vessel;
    (g) a catalyst bed filling said reaction chamber for causing methanol and steam to react to produce hydrogen;
    (h) a plurality of tubular hydrogen permeable membranes in said catalyst bed extending through said second end wall;
    (i) a hydrogen outlet passage in said second end wall for receiving hydrogen from said membranes and discharging the hydrogen from the apparatus;
    (j) a retentate manifold in said reaction chamber connected to said second vessel at said closed end thereof, said manifold having a sieve for admitting retentate gases into the manifold; and
    (k) a retentate outlet connected to said manifold for discharging retentate gases from said housing.

2. The methanol-steam reforming apparatus of claim 1, wherein said catalyst includes an inlet end supported at least in part by said mesh at an outlet end of said heating zone, whereby reaction of the reactants entering the catalyst bed is initiated before the reactants and any products of reaction encounter said membranes.

3. The methanol-steam reforming apparatus of claim 2, wherein said free end of said second vessel is flared, the inlet end of the catalyst bed being at least partially supported by said flared free end of the second vessel.

4. The methanol-steam reforming apparatus of claim 3, wherein said membranes extend into said catalyst bed from said second end wall a distance such that at least the initial five percent of catalyst bed is free of membranes.

5. The methanol-steam reforming apparatus of claim 4, wherein the catalyst bed is particulate copper, zinc oxide and alumina.

6. The methanol-steam reforming apparatus of claim 5, wherein the membranes are a palladium—silver alloy.

7. A methanol-steam reforming apparatus for producing hydrogen comprising:
    (a) a housing including:
        (i) a cylindrical upper portion having a circular top wall, and
        (ii) a cylindrical base;
    (b) a cylindrical first vessel extending downwardly from said top wall of the housing defining a heating chamber;

(c) at least one heater in said heating chamber;

(d) a second vessel in said housing including:
a cylindrical side wall having a closed bottom end and a free top end spaced apart from said top wall of the housing upper portion defining a gap through which fluid can flow, the area between the cylindrical upper portion of the housing and the second vessel defining a heating zone, and the area between the side wall of the second vessel and the upper portion of the housing defining a reaction chamber extending around a major portion of the second vessel;

(e) an inlet duct extending axially through said top wall of the housing and said first vessel into said heating zone for introducing reactants into said heating zone;

(f) a heat conducting mesh in said heating zone for heating reactants and conducting heat from said first vessel to said second vessel;

(g) a particulate catalyst bed filling said reaction chamber for causing methanol and steam to react to product hydrogen;

(h) a plurality of tubular hydrogen permeable membranes extending upwardly from said base into said catalyst bed for receiving hydrogen from the catalyst bed, said membranes having closed top ends and open bottom ends;

(i) a hydrogen outlet passage in said base connected to said open bottom ends of said membranes for receiving hydrogen from said membranes and discharging the hydrogen from the apparatus;

(j) a retentate manifold beneath and connected to the closed bottom end of said second vessel, said manifold having a sieve for admitting retentate gases into the manifold; and (k) a retentate outlet extending radially outwardly from said manifold through a bottom end of the catalyst bed and said base for discharging retentate gases from the housing.

8. The methanol-steam reforming apparatus of claim 7, wherein said top end of the side wall of said second vessel is flared, the flared top end supporting at least part of an inlet end of the catalyst bed.

9. The methanol-steam reforming apparatus of claim 8, wherein said membranes extend upwardly into said catalyst bed a distance such that an initial five percent of said catalyst bed is free of said membranes.

10. The methanol-steam reforming apparatus of claim 9, wherein said catalyst bed is particulate copper, zinc oxide and alumina, and said membranes are a palladium—silver alloy.

11. The methanol-steam reforming apparatus of claim 7, wherein said base includes an annular trough in a top surface thereof; and a membrane plate covering said trough, the bottom ends of said tubular membranes extending through said plate for discharging hydrogen into the trough.

12. The methanol-steam reforming apparatus of claim 11, wherein said retentate manifold includes a cylindrical side connected to the closed bottom end of the second vessel and a circular screen on the bottom of the side above and spaced apart from the membrane plate for admitting retentate gases into the manifold.

* * * * *